United States Patent [19]

Junginger et al.

[11] Patent Number: 4,622,936
[45] Date of Patent: Nov. 18, 1986

[54] ELECTRONIC FUEL CONTROLLER FOR AN AUTOMOTIVE INTERNAL COMBUSTION ENGINE

[75] Inventors: Erich Junginger, Stuttgart; Klaus Hahn, Bühlertal; Eberhard Schnaibel, Hemmingen; Erich Schneider, Kirchheim, all of Fed. Rep. of Germany

[73] Assignee: Robert Bosch GmbH, Stuttgart, Fed. Rep. of Germany

[21] Appl. No.: 760,124

[22] Filed: Jul. 29, 1985

[30] Foreign Application Priority Data

Aug. 16, 1984 [DE] Fed. Rep. of Germany ....... 3430076
Mar. 21, 1985 [DE] Fed. Rep. of Germany ....... 3510176

[51] Int. Cl.$^4$ ............................................. F02D 11/10
[52] U.S. Cl. ..................................... 123/399; 123/361
[58] Field of Search ........................ 123/339, 361, 399

[56] References Cited

U.S. PATENT DOCUMENTS

| | | | |
|---|---|---|---|
| 4,419,973 | 12/1983 | Collonia | 123/399 |
| 4,506,642 | 3/1985 | Pfalzgraf | 123/399 |
| 4,519,361 | 5/1985 | Murakami | 123/399 |
| 4,538,579 | 9/1985 | Moriya | 123/399 |

FOREIGN PATENT DOCUMENTS 3302845  2/1984  Fed. Rep. of Germany ...... 123/399

Primary Examiner—Ronald B. Cox
Attorney, Agent, or Firm—Frishauf, Holtz, Goodman & Woodward

[57] ABSTRACT

To allow for apparatus tolerances, aging of equipment, and changes in operation, for example due to changes in temperature, in a closed-loop servo system in which an operator-controlled fuel supply control element (1) provides, via a coupled command control transducer (2), a signal to control a positioning motor (8) which moves a fuel supply control element (9, 29) in accordance with deflection of the operator control panel, a logic and calculating element, in form of a microprocessor (3) is provided, included in the control loop. When the fuel control element, for example a throttle in the induction pipe of an Otto-type internal combustion engine (ICE) or a fuel injection controller of a Diesel engine reaches a predetermined limiting position, for example no-load idling, or full-load wide-open position, and engages a corresponding stop (12, 14; 212, 214), the microprocessor provides a test or monitoring signal which algebraically differs from that which a command signal should have when the fuel control element is at the respective position. The test signal is changed, in linear steps, towards the condition at which an error signal within the servo loop becomes zero or null; the value of the test command signal is stored at that time and used as a compensation or added, algebraically, to the transduced command signal from the command control transducer (2), or interpolated with respect to the other limiting position to derive an interpolation characteristic, thereby modifying the transduced command signal, so that the actual position of the fuel supply control element will be that desired by the operator controlling the operator-controlled controller (1).

19 Claims, 2 Drawing Figures

ELECTRONIC FUEL CONTROLLER FOR AN AUTOMOTIVE INTERNAL COMBUSTION ENGINE

Reference to related application, assigned to the assignee of the present invention, the disclosure of which is hereby incorporated by reference:

U.S. Ser. No. 760,126, filed July 29, 1985, JUNGINGER et al claiming priority of German Applications No. P 34 30 077.5, Aug. 16, 1984, and No. P 35 10 173.3 of Mar. 21, 1985.

German Patent Disclosure Document DE-OS No. 31 09 638, to which European Patent Application No. 0 060 326 corrresponds.

The present invention relates to control of an internal combustion engine, and more particularly to electronic control of the operation of an automotive-type internal combustion engine (ICE) which may be of the Otto engine type, or may be a Diesel engine, and more particularly to a system which is self-adaptive and automatically compensates for changes in signals occurring in the system with differences in operating conditions, or aging of components.

BACKGROUND

Electronic control of an ICE, and particularly an "electronic gas pedal", has been previously described, see German Patent Disclosure Document DE-OS No. 31 09 638, to which European Patent Application No. 0 060 326 corresponds. In accordance with this disclosure, the throttle of a vehicular ICE is changed by a positioning motor which is included in a servo motor loop. The operator-controlled gas pedal is coupled to a potentiometer, supplied from a source of electrical energy, so that the position of the gas pedal changes the position of a slider on the potentiometer and, thereby, provides an output signal which is representative of the deflection—if any—of the gas pedal. The gas pedal, thus, functions as a command signal generator which applies a command signal to a comparator. The comparator receives an output signal from a position transducer coupled to the throttle of the ICE and, if a deviation or error signal between the command signal and the actual position signal is detected, the positioning motor is controlled to change the position of the throttle to null the error signal.

Use of an electronic pedal in such a system requires precise positioning of the throttle with a minimum opening of the throttle to permit the engine to operate under idling conditions, and with appropriate idling speed. Should the throttle be moved to a position which is too close towards totally shut-off condition, the engine might stall because its minimum speed may drop below the required idling speed thereof. The throttle must be accurately controlled and, then, it is desirable to provide signals which are representative ofa minimum and a maximum throttle position, so that, by interpolation, intermediate values of the throttle will accurately correspond to the desired throttle positions, as commanded by depression of the throttle, that is, the "gas" pedal.

THE INVENTION

It is an object to provide an electronic control system which is adaptive or self-learning and provides for adaptively storing representations of mechanical limiting positions of the fuel control element of the ICE with respect to corresponding actual command signals derived from an operator-controlled fuel controller. Inaccuracies within the control loop, arising from tolerances in mechanical or electrical components, aging, non-linearities due to temperature, and differential effects and the like are to be automatically compensated.

Briefly, a logic and calculating stage, which includes a memory section, is coupled between the command controller, typically an operator or a "gas" pedal, and the comparator of the control loop. The logic and calculating stage has a transfer function which modifies the command signal applied to the comparator to calculate and apply to the comparator a modified command signal. The modified command signal is modified in relation to the actual fuel supply signal with respect to a predetermined characteristic of the actual fuel supply signal at a given command condition. The memory stores a possible deviation between the transduced command signal received from the command controller, and a modified command signal which is applied to the comparator and which results in the actual fuel supply signal having the predetermined characteristic, that is, resulting in the predetermined position of the fuel control element.

Of course, the system could be reversed, in the sense that the logic or calculating element could be included between the output from the position transducer and the comparator, rather than between the command control transducer and the comparator.

Typical predetermined characteristics of the actual fuel supply signal are associated with limiting positions of the fuel supply control element, for example a throttle flap in the induction pipe of an Otto engine, or a fuel control lever of the injection unit of a Diesel engine, such as idle position or full-load positions. Deviations in the transduced command signal and the actual position signal at limiting positions then can be stored in the memory section of the logic and calculating stage and applied as correction factors to modify the respective transduced signal being applied to the comparator.

In the discussion that follows, and in the drawing, reference will be made to the preferred and simplest way of arranging the system, namely to including the logic and calculating stage in the signal path from the operator-controlled engine controller, typically the fuel supply pedal in a vehicle, since adaptation of the system to including the logic and calculating stage in the portion of the loop from the actual position transducer of the fuel supply controller being a variation readily designed by use of current engineering knowledge.

The system has the advantage that specific operating conditions, for example limiting conditions such as idle speed of full load of the engine, and corresponding to minimum or maximum positions of the actual fuel control element, can be easily determined and characterized by a specific minimum or maximum command signal level or value.

In accordance with a feature of the invention, and with a preferred arrangement of the system, and simply carrying out a method of adaptively operating the system, the command signal characteristic, at a limiting position of the fuel control element, is linearly varied. The then occurring output from the control amplifier, usually present and coupled between the output of the comparator and the positioning motor, is monitored. This permits precise positioning of the throttle in the limiting position, while also allowing for consideration of the dynamics of the control loop. A minimum fuel controller position can be easily determined by adding a constant signal value to a minimum position of the throttle, the constant signal value corresponding to the throttle position which permits the engine to operate at design idle speed. Determination of the minimum fuel controller position is usually possible by sensing when the vehicle operates under coasting or engine braking condition. This is an operating condition which arises frequently under traffic condition of an automotive vehicle and, during coasting, the performance of the vehicle is unaffected even if the positioning motor of the fuel controller is deenergized. The operator will not notice such deenergization and no jolts or sudden changes in vehicle operating performance will be observed.

In accordance with a preferred feature of the invention, the actual value of the transduced position signal, as determined by the positioning motor which changes the position of the fuel controller, likewise changes the command signal corresponding to a predetermined position of the fuel controller, for example a limiting position, that is, idle or full load. A limiting position, which is precisely defined, can be used to accurately define the command signal which ought to control this limiting position. Similarly, a limiting position for full load of the fuel controller can be derived, for example by a stop against which the fuel controller cannot move any further. The position signal at the respective stop—idle or full load—is then determined and compared with the command signal derived from the controller. If there should be any deviation, a deviation quantity can be stored and used to modify the command signal, interpolating in intermediate positions between no load and full load. Thus, in a simple manner, easily carried out by readily available electronic components, intermediate values between idle and full-load operation of the engine can be readily determined, so that the actual performance of the system—from operation of the operator-controlled fuel controller to the actual change of the fuel control element of the engine—will be independent of changes within the control loop.

DRAWINGS

FIG. 1 is a basic schematic block diagram of the system in accordance with the invention, applied to an Otto engine; and FIG. 2 is a fragmentary diagram of the invention, applied to a Diesel engine.

DETAILED DESCRIPTION

Figure 1:
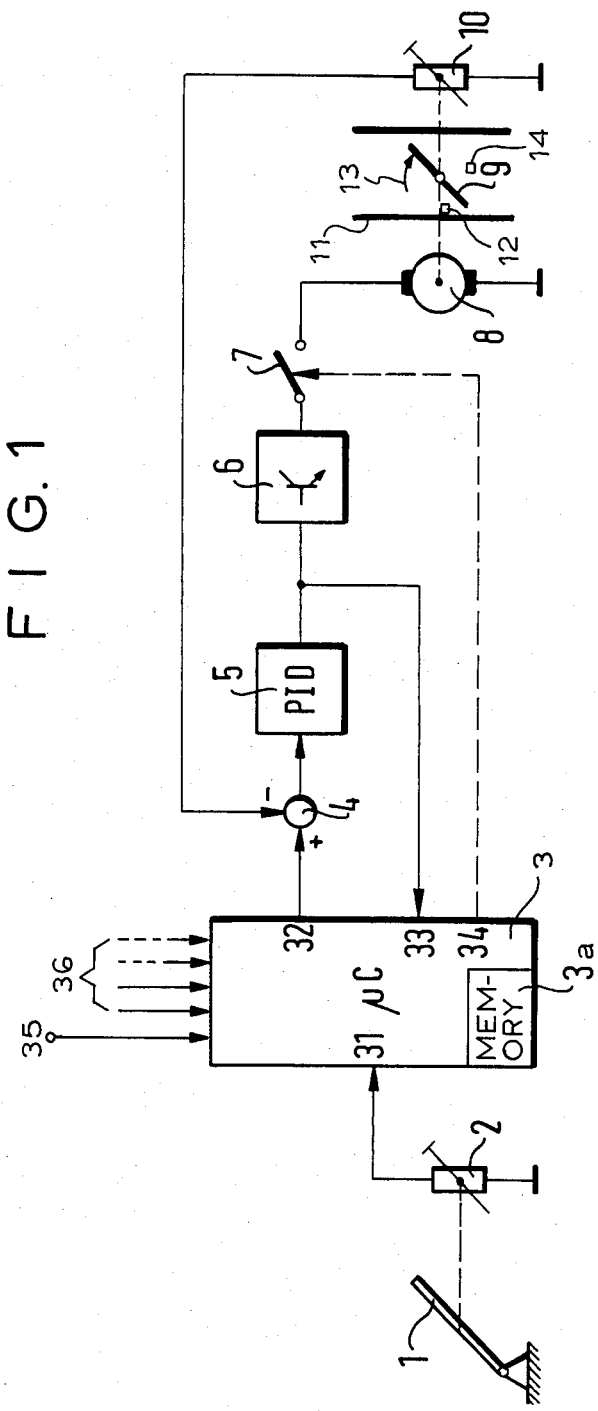

An operator controlled fuel control pedal, typically the gas pedal or fuel control pedal a vehicle, is schematically shown at 1, coupled to the movable element of a potentiometer 2, so that the movable element of the potentiometer 2 will provide a voltage which varies as a function of the deflection of the pedal 1. The resistance of the potentiometer 2 changes proportionally with the deflection angle of the pedal 1, and thus forms a position transducer for the operator-controlled pedal. The transducer output signal is connected to an input terminal 1 of a microprocessor or microcomputer 3. The microcomputer 3 can be any well-known suitable microcomputer, which may have analog or digal inputs and outputs. If the inputs are analog inputs, the analog input signals are converted by well known analog/digital (A/D) converters into digital form; similarly, digital signals can be reconverted by D/A converters. The A/D and the D/A converters are not shown in the drawing for simplicity and may be in accordance with any suitable and well known construction.

The computer 3 receives a command signal at the input terminal 31, determined by a commanded value as controlled by an operator operating the pedal 1. The computer 31 transfers the command signal to an output 32 and, from the output 32 to the positive input of a comparator or differential circuit 4. The negative input of the differential circuit 4 is coupled to an actual value transducer 10, which, again, may be a potentiometer which is coupled to the throttle 9 located within the induction pipe 11 of an ICE of the vehicle. The potentiometer 10, thus, functions as an actual position transducer, providing output signals representative of the actual position of the throttle 9. The output of the difference forming circuit 4, which is the error signal between a command signal and an actual signal, and is the difference between the commanded value and the actual value, and, also, referred to as the control difference value. The control difference value or error signal is applied to the input of a controller 5 which, for example, may be a proportional-integral-differential control element. The output of the controller 5 is connected to a power amplifier 6 which, in turn, controls rotation of a positioning motor 8 which is coupled to the throttle 9 to change the position of the throttle 9 as the motor 8 rotates. Thus, the throttle 9 is controlled in a servo loop.

In accordance with a feature of the invention, a switch 7 is connected between the power output stage 6 and the motor 8, the switching position of which is controlled from the computer 3. An output 34 from the computer 3 is connected to the control input of the switch 7 to, respectively, open or close the switch. Under ordinary operating conditions, the switch 7 is closed, so that the control loop is closed and the motor is energized if the difference forming circuit 4 or comparator 4 determines that an error signal is present.

The output from the controller 5 is connected as an input to the computer 3.

The computer 3 is a microprocessor which may be of the type customarily used in computer-controlled automotive operating systems; it is integrated in the vehicle control system and, besides carrying out the functions described in connection with the present application, may have other computing functions. The computer 3 receives input information of data relevant to the operation of the vehicle. These input informations signals are, schematically, shown by the arrows collectively numbered 36 and, for example, include information of ignition instant, fuel injection instant, engine temperature, air/fuel ratio, and the like; an input 35 is provided which determines if the vehicle operates under coasting or engine braking condition. The terminal 35 may form part of the group of inputs 36. When the computer 3 recognizes the operating condition "coasting" or "engine braking" of the vehicle, an output signal is applied to terminal 34 to open the switch 7. The motor 8, thus, will be deenergized, regardless of the output from controller 5. The throttle 9, within the induction pipe 11, is mechanically coupled to a spring, schematically shown by the force arrow 13, and tends to the move the throttle 9 against a low-fuel or minimum-fuel stop 12, for example in the induction pipe 11, or suitably coupled to the shaft of the throttle 9, as soon as the motor 9 does not provide a counter-directed torque. A maximum throttle opening stop 14 is also provided.

The microprocessor 3 includes the usual component present in automotive-type microprocessors, such as a memory section 3a, a clock source, and the various other usual components, besides the A/D and D/A converters.

Control method, and system operation:

Let it be assumed that the microprocessor 3 has recognized that the vehicle is operating under coating or engine braking condition. The output terminal 34 from the microprocessor will provide a signal to the switch 7 to open the switch, so that the motor 8 will be deenergized, and the spring force 13 will return the throttle 9 to the minimum or lowest fuel stop 12, as soon as motor 8 fails to provide a counter toreque. In this position, the actual position transducer 10 will provide a fixed axial minimum value, which corresponds to the position of the throttle against the throttle minimum stop position, that is, against the stop 12. The computer 3, after the switch 7 has opened, now enters into a search routine. Starting from one, upwardly defined limited maximum search value, for example corresponding to an output of 10° throttle opening angle, it decreases the voltage provided by the microcomputer to the comparator 4, linearly, in steps. This means that the command value of the open control loop is changed downwardly. At the same time, the input terminal 33 will receive output signals from the controller 5. The computer 3 stores that value at the output 32 which will be representative for the minimum throttle position, that is, throttle against the stop 12, at which the output of the controller 5 shows that the throttle 9 is at the stop 12.

To determine the minimum throttle opening, to insure operation under idling condition of the engine—and corresponding to a virtual or theoretical idle throttle stop position—the computer 3 will add to the so derived value of the throttle position at the minimum or lower stops 12 a constant value. Consequently, the minimum command value which is provided by the transducer 2 will have a lower command value associated therewith which will result in a lower or minimum fuel supply position of the throttle for idle operation of the engine.

The method and system has the advantage that all mechanical tolerances, twists and torques in shafts, effects of aging of components within the electronic and/or the mechanical system are automatically compensated without, in any way, impairing the sensitive control of idle speed of the engine.

When the motor 8 is deenergized, that is, upon opening of switch 7, the minimum throttle stop position can be determined differently. In the previous example, a maximum search command value, set at an upwardly defined point, e.g. 10° of throttle deflection, could be replaced by providing a minimum search command value, which is defined or limited with respect to a lowest minimum value. Starting, for example, from the lowest minimum value, the computer, in linear steps, changes the voltage at its output 32 until the output of the controller 5 recognizes a null or zero error signal. This corresponds to control identity, that is, the output from the computer 3, the commanded search value will then be equal to the actual value derived from the transducer 10. There may be a difference with respect to the input to the computer 3 at terminal 31, although the output, under the condition described, from the control amplifier 5 will be null or zero. The commanded search value at theparticular instant or null output from controller 5 is then stored in the memory section 3a as the commanded operating value for the minimum position of the throttle 9 at the minimum throttle stop 12. In analogous manner, the computer 3 determines a corresponding idle stop value for a defined idle opening of the throttle by addition of a constant to the so determined throttle minimum position angle or value, that is, throttle against stop 12.

The controller 5, preferably, is a proportional-integral-differential controller, but need not be; the controller 5 may also operate as a proportional-integral controller. The controller 5, when including an integrating section, and due to the integrating effect thereof, prevents determination directly from the positioning level as an output value what the control difference, as derived from the comparator 4, might be. The respective dwell time of the voltage at the output 32 of the computer between two steps in the linear step range can be made substantially longer than the time constant of the integrator within the controller 5. If this is done, it will be possible to at least determine if the input signal changes sign from the output signal. This timing of the steps from output 32 of the computer 3 insures that the positioning value at the output signal of the controller, at the latest, will become null, or change sign within a time interval which is less than the dwell time of a voltage step at the output 32 of the computer 3. The evaluation of the positioning value as an output signal of the controller 5 by the computer 3, see feedback line to input 33, is carried out at the end of a step, that is, at the termination of the dwell time of the respective voltage steps, immediately in advance of transition to the next voltage step. In this manner, the integrator is operated as a highly sensitive comparator with high amplification, so that very small voltage steps can be discriminated. This has the effect that the minimum throttle position stop can be determined with high accuracy. The time required for this automatic calibration routine is adequately available during coasting or engine braking phases of operation of the motor vehicle.

The minimum throttle stop or abutment position, and thus the virtual idle stop of the throttle 9, can also be determined with the switch 7 closed, and when the motor 8 is energized.

Let it be assumed that the computer 3 receives an input at terminal 31 indicative of OFF position of the operator pedal 1, or an input signal at terminal 35 indicative of engine braking condition, that is, condition in which the vehicle is pushed or coasting downhill, for example. Upon recognition of such condition, the computer 3 provides a maximum search command level which must be arranged to be above the operating command value which requires closing of the throttle 9 by the motor 8. This maximum search command value is decreased, in linear steps. The control loop to the motor 8 is closed and, due to the closed control loop to the motor 8, the actual value transduced by transducer 10 will follow the corresponding instantaneous search command value. When the throttle 9 reaches its mechanical stop 12, the control difference signal or error signal will change sign, since the positioning motor initially provides a force against the reset force 13 by the spring, but, when the throttle has reached the stop 12, however, must provide a reverse torque in the direction of the stop 12. The transition through null of the error signal can be used as an indication that the throttle is at the stop 12, and the then pertaining output from terminal 32, that is, the search command value, can be stored in memory section 3a as the operating command value for the position of the throttle 9 against stop 12.

Instead of recognizing transition of the positioning signal through null, a predetermined value of the positioning signal, which corresponds to a defined backward control of the throttle against the stop 12, may be used as the calibrating condition to determine the operating command value for the throttle at the minimum stop position 12.

The method described immediately hereinabove has the advantage that the throttle is pressed with a predetermined torque against its stop 12, so that the operating command value can be determined independently of friction in the region of the stop, and hence very precisely.

A similar and third method can also be used with the control loop closed to determine the maximum throttle position, that is, the position of the throttle 9 under full-load operation.

The microprocessor 3 will recognize at its input 31 maximum deflected position of the pedal 1 by sensing, for example, maximum output from transducer 2. At that position, the output 32 provides a predetermined minimum search command value for the full-load stop 14 which, again, is incremented or increased in linear steps until the throttle actually engages the mechanical full-load stop 14. The actual position value, transduced by transducer 10, then will not change anymore. When the mechanical stop 14 is reached, the actual value will remain at a fixed limit, which will result in a substantial increase in positioning value since, already a small control difference applied to an integrating controlled, will have as a consequence a high positioning output. The rise in positioning output signal from the controller 5 to a value above a predetermined possible value for actual deflection of the throttle 9, that is, within the control range, is recognized in the computer 3 by a threshold discriminator, and the search command value which was applied at terminal 32 when this substantial increase was sensed, is then stored in the memory 3a as the operating command value for full-load position of the throttle 9.

Of course, if a full-load position of the pedal 1 is transduced and recognized at the input 31 of the controller, it may, in accordance with an analogy to the second described method, provide a predetermined maximum search command value for the full-load position, that is, throttle 9 at stop 14, which again is decreased, in linear steps, so that the actual value will remain, since the throttle is at the stop 14, and the actual value will be held at the value of the throttle at stop 14. When the commanded search value and the actual value are equal, and the positioning level at the output of the controller 5 passes below a predermined value, the system is calibrated in that the actual value will then be that at which the throttle 9 engages the stop 14. The search command value which was applied from terminal 32 at the time the output from the controller 5 dropped below a predetermined then is stored as the operating command value corresponding to maximum deflected position.

The system, and the methods, thus provide for determination of an operating command value for idle position, as well as an operating command value for full-load position. By well known interpolation between the two values, preferably along a linear characteristic, a correction characteristic can be applied to signals at input 31 of the microcomputer, which correspond to the transduced values of the transducer 2, so that recalibrated and modified command signals are, under normal operating conditions, applied from input 31 of the microcomputer 3 to the terminal 32, thereby accounting for effects of aging, manufacturing tolerances of components and the like.

Figure 2:
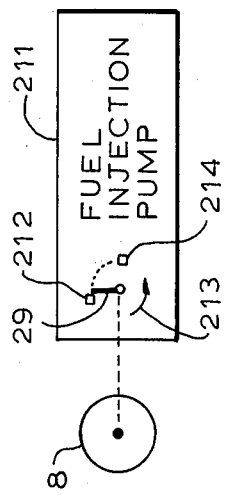

The method and system have been described specifically in connection with an Otto-type automotive ICE. The method and system may, of course, also be used in connection with a Diesel engine. In such a case—see FIG. 2—rather than controlling the throttle 9, the injection control lever 29 of the fuel injection pump 211 is controlled. The injection control lever 29 is operable between two stops 212, 214, against the force of a spring, schematically shown as spring force 213 by the motor 8. The operating control lever 29, with the stops 212, 214 corresponds to the throttle 9 with the minimum and maximum throttle position stops 12, 14, respectively. The remainder of the system can be identical to that described in connection with the Otto engine, and the calibrating methods, likewise, are the same.

Various other changes and modifications may be made within the scope of the inventive concept. For example, the outputs of the transducers 2, 10 can be, respectively, reversed so that the microprocessor 31 is coupled to the transducer 10, and the transducer 2 is coupled to the comparator 4.

A suitable microprocessor 3 for use in the system is: $\mu$C 8031 made by Intel.

A suitable controller 5 for use in the system is: LM 2902 Op. Amp. made by National Semiconductor.

A signal at terminal 35 of the microcomputer 3 can be derived, for example, from a switch coupled to the pedal 1 and indicating when the pedal 1 is in OFF or unoperated condition; or, for example, a signal can be applied to terminal 31 upon operation of the brake of the vehicle which, in the conventional pedal arrangement, necessarily results in release of the operator control pedal. Operation of the brake can be signaled to the terminal 35, for example, by coupling the terminal 35 to the brake or stoplight control switch so that, each time, or at selected times when the brake is operated, a recalibrating subroutine can be entered into. This recalibrating subroutine then will determine the relationship of the output from transducer 2, at terminal 31, to the output from transducer 10 being applied to the comparator 4, and add a correction factor to provide a modified command signal, the correction factor being stored in the memory 3a. In accordance with current technology in the microprocessor field, the methods can all be controlled by software.

We claim:

1. Electronic fule controller for an automotive internal combustion engine (ICE) having
   an operator-controlled controller (1);
   a command control transducer (2) coupled to the operator-controlled controller (1) and providing a transduced command signal;
   a fuel supply control element (9, 29);
   a position transducer (10) coupled to the fuel supply control element (9,29) and providng an actual fuel supply signal;
   a positioning motor (8) coupled to the fuel supply control element for positioning thereof;
   comparator means (4) coupled to receive as inputs said command signal and the actual fuel supply signal and comparing said signals and providing an error output signal upon deviation between the input signals; and a control circuit (5) coupled to receive the error signal as an input and controlling operation of the positioning motor (8); and comprising, in accordance with the invention, a logic and calculating circuit (3) including a memory section (3a) coupled between the command control transducer (2) and the comparator (4) and having a transfer function which modifies the command in relation to the actual fuel supply signal, with respect to a predetermined characteristic of the actual fuel supply signal at a predetermined operating condition of the engine, said control circuit (5) being connected to the logic and calculating element (3), the logic and calculating element being responsive to and monitoring the output from the control circuit and recognizing when the output from the control circuit is zero or null, to thereby recognize a zero or null error signal, said logic and calculating circuit (3) providing an input to the comparator means (4) representative of a test command signal which changes linearly, the memory (3a) storing the value of the test command signal when the output from the control circuit is recognized to be null or zero, the memory (3a) storing a value representative of deviation between the transduced command signal received from the command transducer (2) and the modified command signal being applied to the comparator (4) which then results in an actual fuel supply signal having said predetermined characteristic.

2. Controller according to claim 1, wherein said condition comprises a limiting operating condition of the engine.

3. Controller according to claim 2, wherein the limiting operating condition of the engine is idle condition.

4. Controller according to claim 2, wherein the limiting operating condition is full-load condition.

5. Controller according to claim 1, further including switching means (7) coupled serially with the positioning motor (8) and controllable to deenergize the positioning motor;

said switching means being controlled by the logic and calculating element (3) when the logic and calculating element recognizes a predetermined operating condition (35);

and wherein the logic and calculating element (3) provides a test or monitoring signal, algebraically, in excess of that representative of a limiting position of the fuel supply control element, the logic and calculating element changing said test or monitoring command signal towards zero or null, and storing the obtained value when the output signal from the control circuit (5), as recognized by the logic and calculating circuit, is actually zero or null.

6. Controller according to claim 5, wherein a minimum fuel supply or idle stop (12, 212) is provided against which the fuel supply control element (9, 29) is biassed to engage when the vehicle operates under coasting or engine braking condition, and corresponding to an idling speed of the engine;

and wherein the logic and calculating element provides a test or monitoring command signal to the positioning motor (8), said test or monitoring command signal being linearly—with respect to time—algebraically changed towards condition null until the actual value of energy applied to the motor (8) has reached a predetermined defined value.

7. Controller according to claim 6, wherein the test or monitoring command value is representative of a maximum value and the algebraic change thereof comprises reduction of said value.

8. Controller according to claim 6, wherein said test or monitoring command value comprises a minimum value and the algebraic change comprises increase of the minimum value.

9. Controller according to claim 1, wherein the fuel supply control element (9, 29) is engageable with a full-load stop (14, 214);

and the logic and calculating element (3) provides a test or monitoring command value to the motor (8) when the fuel control element is engaged against the full-load stop, and the memory (3a) stores the value when the fuel supply control element has engaged the full-load stop (14, 214), the logic and calculating element algebraically changing the test or monitoring command signal from a predetermined value algebraically differing from a signal value representative of engagement of the fuel control element with the full-load stop.

10. Controller according to claim 1, wherein the fuel supply control element comprises the throttle of an Otto-type ICE.

11. Controller according to claim 1, wherein the fuel supply control element comprises the fuel injection controller of a Diesel-type ICE.

12. Method of monitoring the operation of an electronic fuel control system for an automotive internal combustion engine (ICE) having an operator-controlled controller (1);

a command control transducer (2) coupled to the operator-controlled controller and providing a transduced command signal;

a fuel supply control element (9, 29);

a position transducer (10) coupled to the fuel supply control element and providing an actual fuel supply signal;

a positioning motor (8) coupled to the fuel supply control element for positioning thereof;

comparator means (4) coupled to receive, as inputs, the command signal and the actual fuel supply signal and comparing said signals and providing an error output signal to a control circuit (5);

said control circuit (5) being coupled to receive the error signal as an input and controller operation of the positioning motor (8);

generating a test command signal, when said fuel supply control element is at a limiting position, deriving said error output signal as a function of deviation between the actual fuel supply signal and the command signal, monitoring the error output signal from the control circuit (5) and recognizing when that output signal reaches zero, varying the test command signal until the test command signal and the actual fuel supply signal, are equal storing the then-pertaining value of the command signal as a required command signal; and modifying, based upon the stored required command value, the command signal received from the command control transducer (2) as a function of deviation between the actual fuel supply signal received from the fuel supply position transducer (10) and the command signal received from the command control transducer (2).

13. Method according to claim 12, wherein the change in the test or monitoring command signal is carried out, linearly, with respect to time, in steps;

and wherein the modifying value is determined by sensing when the output from the control circuit (5) is zero or null, thus indicating equality between the command signal applied to the comparator and the actual fuel supply signal.

14. Method according to claim 12, including the step of recognizing a limiting operation condition of the engine;

upon such recognition, initiating a test phase or subroutine including generation of said monitoring or test command signal, and varying the monitoring or test command signal, linearly;

and wherein said test-command signal is generated at a value, algebraically, in excess of a value representative of position of the fuel supply control element (9, 29) against a stop (12, 14; 212, 214) representative of extreme limiting operating conditions, and the step of varying said test command signal comprises varying said command signal, linearly, in a direction tending to decrease or null the error signal from the comparator (4).

15. Method according to claim 14, wherein the step of recognizing a limiting, extreme operating condition of the engine comprises recognizing when the engine is operating under idling conditions, and the fuel control element (9,29) is engaged against idle speed stop.

16. Method according to claim 14, wherein the limiting or extreme operating condition comprises full-load condition;

and the fuel control element (9, 29) is engaged against a full-load stop (14, 214).

17. Method according to claim 15, wherein the limiting or extreme operationg condition comprises full-load condition;

and the fuel control element (9, 29) is engaged against a full-load stop (14, 214);

and further including the step of generating an interpolation correction characteristic from the stored values between the no-load or idle condition of operation of the engine and full-load condition of operation of the engine, and storing said correction characteristic in a memory, and correcting the actual transduced command signal as a function of the thus obtained stored interpolated correction characteristic.

18. Method according to claim 12, including the step of adding a correction factor to the transduced command signal, said correction factor being derived as a function of the difference between the transduced command signal and the test or monitoring command signal at a limiting position obtained upon operation of the engine at a predetermined operating condition.

19. Method according to claim 12, including the step of deenergizing the positioning motor upon recognition of operation of the engine under idling condition.

* * * * *